United States Patent [19]
Gilard, Sr.

[11] Patent Number: 5,537,776
[45] Date of Patent: Jul. 23, 1996

[54] FISHING LINE CONNECTOR

[76] Inventor: Leonard J. Gilard, Sr., 129 Parkway, Poplar Grove, Ill. 61065

[21] Appl. No.: 294,257

[22] Filed: Aug. 23, 1994

[51] Int. Cl.$^6$ .................................................. A01K 85/00
[52] U.S. Cl. ........................................ 43/42.49; 43/44.83
[58] Field of Search .............................. 43/42.49, 44.83, 43/44.84, 44.85, 44.94, 43.1, 43.16, 44.82

[56] References Cited

U.S. PATENT DOCUMENTS

| | | | |
|---|---|---|---|
| 103,645 | 5/1870 | Muscroft | 43/44.83 |
| 1,401,086 | 12/1921 | King . | |
| 2,222,277 | 11/1940 | Baker | 43/44.83 |
| 2,272,332 | 12/1940 | Sisson . | |
| 2,545,326 | 3/1951 | Westfall | 43/44.85 |
| 2,754,615 | 7/1956 | Toil . | |
| 2,979,849 | 4/1961 | Anderson | 43/42.06 |
| 3,031,791 | 5/1962 | Banks | 43/42.06 |
| 3,293,791 | 12/1966 | Hinkson | 43/42.49 |
| 3,604,143 | 9/1971 | Sausers . | |
| 3,754,347 | 8/1973 | McGahee . | |
| 3,913,185 | 10/1975 | James | 43/42.49 |
| 4,361,977 | 12/1982 | Lawler . | |
| 4,649,664 | 3/1987 | Mahan . | |
| 4,674,226 | 6/1987 | Mahan . | |
| 5,009,025 | 4/1991 | Austad | 43/44.83 |
| 5,081,785 | 1/1992 | Kahng . | |
| 5,113,616 | 6/1992 | McManus . | |
| 5,279,067 | 1/1994 | Tollison | 43/44.83 |

FOREIGN PATENT DOCUMENTS

| | | | |
|---|---|---|---|
| 0937485 | 8/1948 | France | 43/44.83 |
| 0175734 | 8/1953 | Germany | 43/43.1 |
| 0293076 | 7/1928 | United Kingdom | 43/44.83 |

*Primary Examiner*—Jack W. Lavinder
*Assistant Examiner*—James Miner
*Attorney, Agent, or Firm*—Russell D. Slifer

[57] ABSTRACT

A fishing line connector having a shank, a coiled member, defined by a plurality of uniformly spaced, contiguous coaxial coils arranged in longitudinally extending relation and having an axial opening therethrough, and an open-ended eye loop. The connector provides a knotless connection for a fishing line when the line is wrapped around the coiled member in alternating longitudinal directions and snapped into the open-ended eye loop.

15 Claims, 2 Drawing Sheets

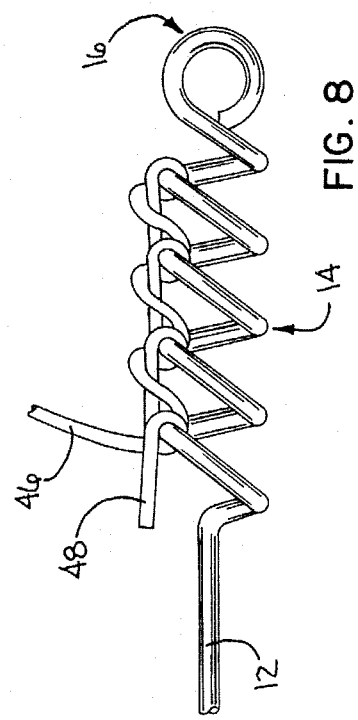
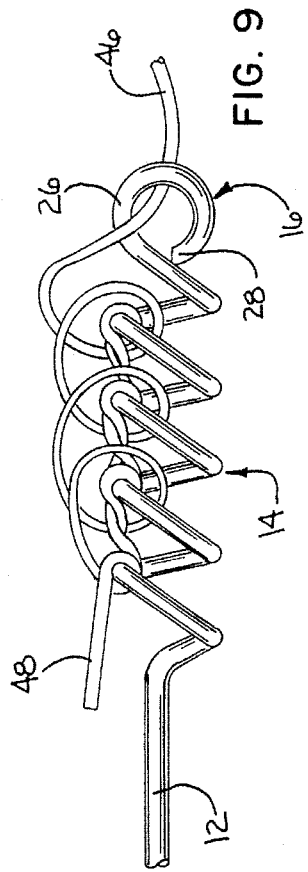
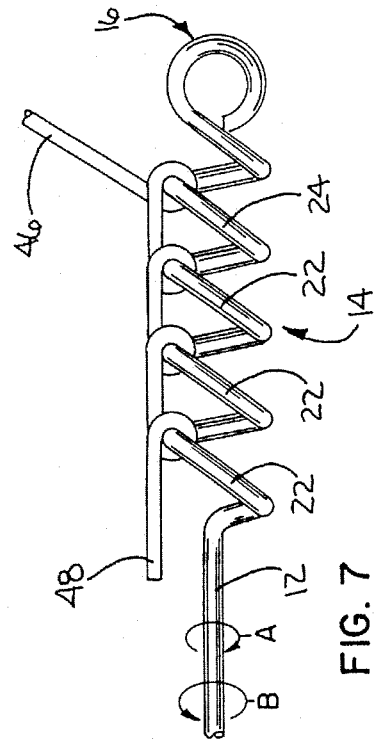
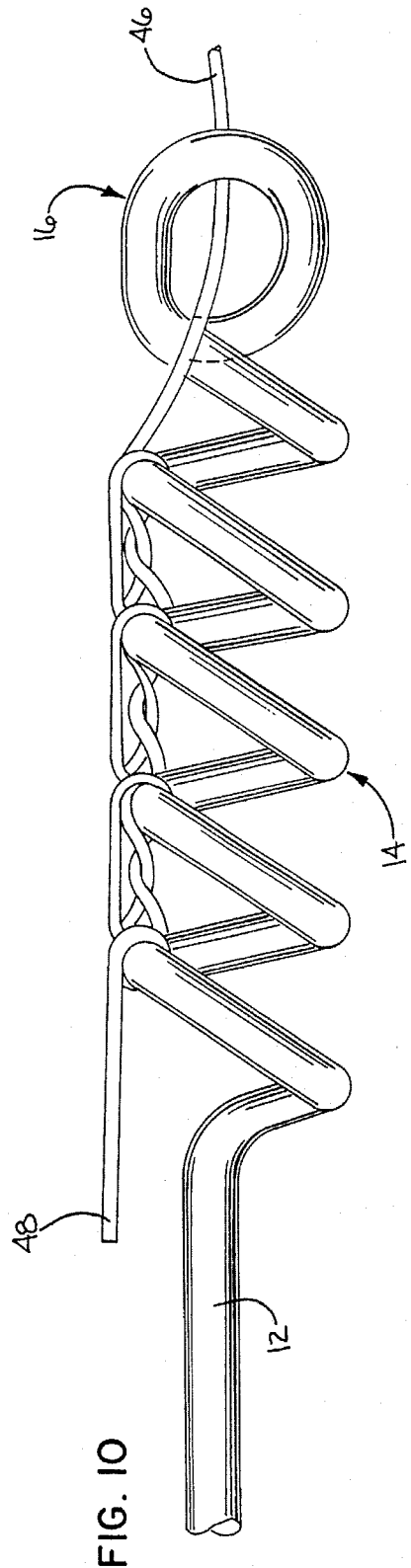

FISHING LINE CONNECTOR

BACKGROUND OF THE INVENTION

Conventional fishing equipment includes a fishing pole, a reel mounted on the fishing pole and fishing line wound around the reel and extending from the fishing pole. The end of the fishing line is typically connected to a fishing hook or fastener for attaching a fishing lure or other fish catching device.

The fasteners are typically either a "snap leader" or a "snap swivel." A snap leader is a relatively short (usually 6 to 18 inches in length) piece of fishing line or metal wire. One end of the leader has a closed-eye loop for affixing the fishing line, while the other end typically includes a resilient clip. The clip may be connected or disconnected to a number of different fishing lures without connecting the fishing line directly to those lures.

A snap swivel is a fastener having a closed-eye loop for affixing the fishing line, while the other end typically includes a resilient clip. A pivot member is located between the eye loop end and the clip end, thereby allowing the two ends to rotate, or swivel, with respect to each other without twisting the fishing line. The clip, as with the leader, may be connected or disconnected to a number of different fishing lures without connecting the fishing line directly to those lures.

Conventional fishing hooks, fasteners and lures are affixed to the fishing line with a knot. Specifically, the fishing line is inserted through the eye loop in a fishing hook or fastener and tying the line thereto. These connections are difficult to make and inefficient to use. The strength of a traditional monofilament fishing line is severely reduced if formed into a knot, due to the stresses and deformation introduced thereby. The knot thus becomes a "weak link" in the fishing equipment.

Further, tying fishing hooks, fasteners or lures to a fishing line is difficult for many fisherpersons. The physical effects of age, such as arthritis and poor eye sight, and other physical handicaps often create difficulty in forming a proper knot in fishing lines which are typically thin and made of a translucent, slick material. Weather conditions and darkness also increase the difficulty of properly tying a strong knot. Time is often an essential element to fishing, therefore, the slow, cumbersome process of tying a knot reduces the amount of productive fishing.

What is needed is a fishing line connector, and a method of attaching a fishing line thereto, that will provide a strong connection to the fishing line without requiring the tying of a knot.

SUMMARY OF THE INVENTION

In combination, a fishing line connector, and a fishing line secured thereto. The fishing line connector comprising a shank having a first end and a second end, an integral coiled member located at the second end of the shank, the coiled member being defined by a plurality of uniformly spaced, contiguous coaxial coils arranged in longitudinally extending relation, the coils defining an axially extending opening therethrough, and an integral open-ended eye loop located at an outer end of the coiled member. The fishing line being threadingly engaged in one longitudinal direction successively with each coil along the length of the coiled member. The fishing line further being threadingly engaged in an opposite longitudinal direction successively with each coil along the length of the coiled member. The fishing line further being threadingly engaged in the one longitudinal direction successively with each coil along the length of the coiled member and slipped into the open-ended eye loop.

A method for knotlessly attaching a fishing line to a fishing line connector comprising a shank having a first end and a second end, an integral coiled member located at the second end of the shank, the coiled member being defined by a plurality of uniformly spaced, contiguous coaxial coils arranged in longitudinally extending relation, the coils defining an axially extending opening therethrough, and an integral open-ended eye loop located at an outer end of the coiled member. The method comprising the steps of wrapping the fish line around the coiled member longitudinally from the shank to the open-ended eye loop in an opposite rotational direction to that of the coils, such that the fishing line passes transversely between successive coils and threadingly engages with each coil along the length of the coiled member; wrapping the fish line around the coiled member longitudinally from the open-ended eye loop to the shank in the same rotational direction as the previous step, such that the fishing line passes transversely between successive coils and threadingly engages with each coil along the length of the coiled member; wrapping the fishing line around the coiled member longitudinally from the shank to the open-ended eye loop, in the same rotational direction as the previous steps, such that the fishing line passes transversely between successive coils and threadingly engages with each coil along the length of the coiled member; and slipping the fishing line into the open-ended eye loop.

These and other objects and advantages of the invention will become more apparent from the following detailed description when taken in conjunction with the accompanying drawings.

BRIEF DESCRIPTION OF THE DRAWINGS

FIG. 7 is FIG. 1 with a fishing line;

FIG. 8 is FIG. 7 with additional fishing line;

FIG. 9 is FIG. 8 with additional fishing line; and

FIG. 10 is an enlarged view of FIG. 9 with the fishing line taught.

DETAILED DESCRIPTION OF THE PREFERRED EMBODIMENTS

Figure 1:
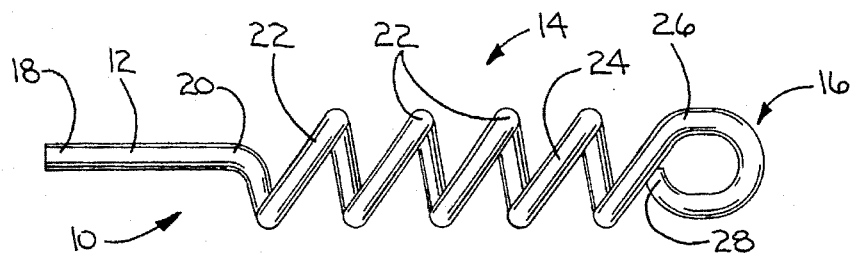
FIG. 1 is a side view of the preferred embodiment of the present invention.
Figure 2:
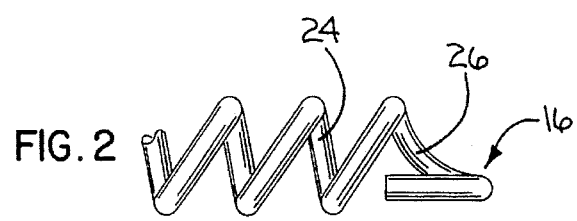
FIG. 2 is a bottom view of an element of FIG. 1 taken along the lines 2—2.

Referring initially to FIGS. 1 and 2, the preferred embodiment of the fishing line connector 10 comprises a shank 12, coiled member 14 having an axial opening that is disposed axially therethrough and an open-ended eye loop 16.

The shank 12 is substantially straight and relatively short, preferably under one inch. The shank has a first end 18 and a second end 20 integrally formed into the coiled member 14. In use, the first end of the shank can be inserted through a hole or eyelet in a fishing lure, or the like, and bent into the form of an eye loop, thereby fastening the lure to the shank. The shank could, similarly, be pre-formed into a resilient clip to allow the shank to be freely connected and disconnected to a number of different lures.

The fishing line connector is made of metal wire having a sufficient hardness to resist unwanted deformation under normal use, such as spring steel or stainless steel. It will be understood by those skilled in the art that a wire initially soft, in order to form the connector, can be hardened to resist future deformation. The cross-section of the wire is preferably circular, although other cross-sectional configurations can be used with equal effect. The cross-section of the metal wire is preferably between 0.015 and 0.100 inches in diameter, although other similar diameters could be used. The preferred cross-section diameter of the wire is 0.045 inches.

The coiled member 14 formed at the second end 20 of the shank 12 comprises a series of contiguous helical coils 22 arranged in spaced longitudinal relation. The spacing of adjacent coils is uniform and is such as to permit a typical fishing line to pass transversely therebetween. The coils are preferably spaced between 0.020 and 0.100 inches apart, thereby, allowing a fishing line to be easily hand wound around each of the coils. The number of coils are between three and ten, with the preferred number being four. It will be understood by those skilled in the art that more than ten coils could be used. The coils defining an axial opening that is disposed axially therethrough. The diameter of the axial opening is preferably greater than 0.020 inches. The shank and coiled member are substantially axially aligned. The open-ended eye loop 16 is integrally formed at the outer most coil 24 of the coiled member 14.

The open-ended eye loop 16 has a shaft 26 which integrally extends longitudinally outwardly from the outer most coil 24 of the coiled member 14 and turns in a downwardly circular direction back toward the coiled member to form a loop, FIG. 1. The open-ended eye loop is substantially aligned with the shank 12 and its axis is substantially perpendicular to the axial opening of the coiled member. The open end 28 of the shaft 26 is longitudinally positioned partially inside the axial opening of the outermost coil 24 and extends upwardly toward the integral end of the shaft 26. The open end of the eye-loop 16 is spaced circumferencially apart from the integral end of the shaft a sufficient distance to allow a fishing line to pass therebetween. As illustrated in FIG. 2, the open-end 28 of the eye loop 16 is also preferably spaced axially apart from the integral end of the shaft 26 a sufficient distance to allow a fishing line to pass therebetween.

Figure 3:
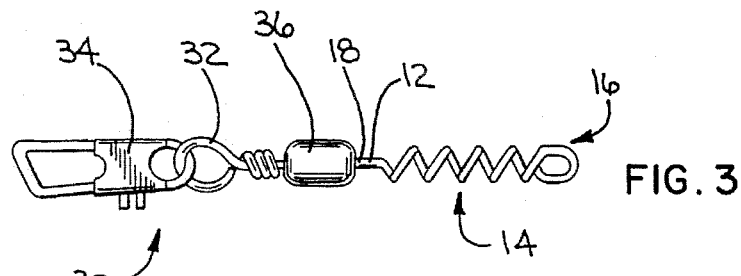
FIG. 3 is a side view of an alternate embodiment of the present invention.
Figure 4:
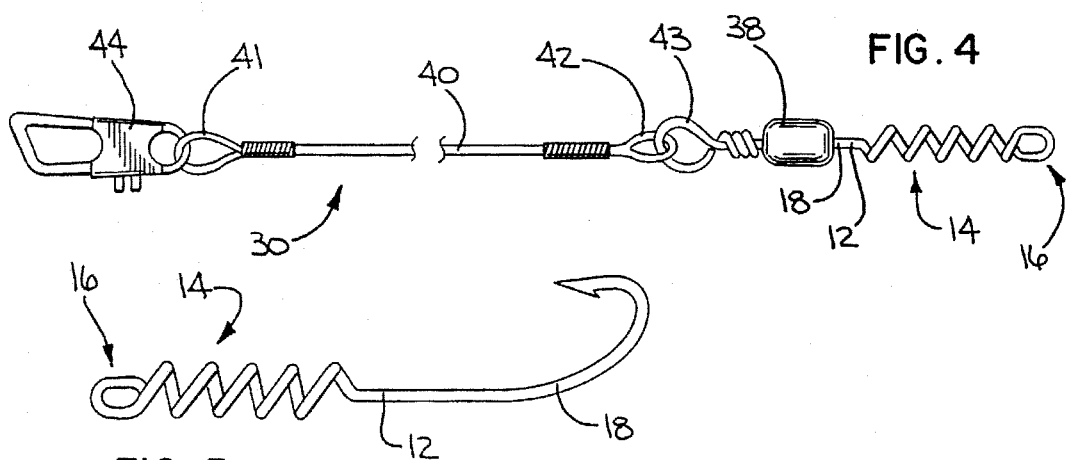
FIG. 4 is a side view of an alternate embodiment of the present invention.

Alternate embodiments of the fishing line connector 10 are illustrated in FIGS. 3 and 4. Each embodiment comprises a shank 12, coiled member 14 having an axial opening that is disposed axially therethrough, an open-ended eye loop 16, and a fastener 30, attached to the first end 18 of the shank, for attaching fishing lures or the like. Thus, in FIG. 3, the fishing line connector 10 has a fastener 30 in the form of a snap swivel attached to the first end 18 of the shank. The snap swivel comprises a loop 32 for affixing a resilient clip 34. A pivot member 36 is located between the loop and the first end 18 of the shank of the fishing line connector 10, thereby allowing the fastener to rotate, or swivel, with respect to the connector. The clip 34 may be connected or disconnected to a number of different fishing lures without connecting the fishing line directly to those lures.

The fastener 30 in FIG. 4 is of the form of a snap leader. The leader is a relatively short (usually 6 to 18 inches in length) flexible member 40 made of fishing line or metal wire. One end of the leader has a loop 41 for affixing a resilient clip 44. The clip may be connected or disconnected to a number of different fishing lures without connecting the fishing line directly to those lures. The opposite end of the leader has a loop 42 interconnected to another loop 43. A pivot member 38 is located between the closed-eye loop 43 and the first end 18 of the shank of the fishing line connector 10, thereby allowing the fastener to freely rotate with respect to the connector.

Figure 5:
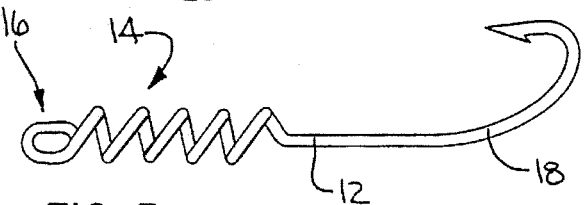
FIG. 5 is a side view of an alternate embodiment of the present invention.
Figure 6:
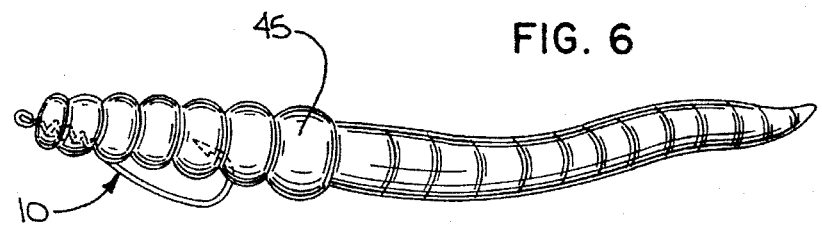
FIG. 6 is a side view of FIG. 5 disposed in a fishing lure.

A still further alternate embodiment of the fishing line connector 10, as illustrated in FIG. 5, has the first end 18 of the shank 12 formed into a fish hook. This embodiment provides fishing equipment for live bait, such as worms or minnows. The coiled member 14 of this embodiment also provides an "anchor-effect" when used with artificial bait, such as a rubber worm 45 (see FIG. 6). When the coiled member is disposed inside the artificial bait by the fisherperson, the coiled member resists pulling out of the bait as a result of longitudinal forces exerted on the fishing line and fishing line connector under normal use. It will be understood by those skilled in the art that the shank formed into a fish hook can have a larger cross-sectional diameter than the cross-sectional diameter of the coiled member and the open-ended eye loop. The fishing hook can therefore be used for larger game fish without the coiled member and eye loop being large and cumbersome.

In application (FIGS. 7–10), the fishing line 46 is affixed to the fishing line connector through a simple four step process of wrapping the fishing line around the coiled member in alternating longitudinal directions successively with each coil along the length of the coiled member. The first step, referring to FIG..7, comprises holding the end 48 of the fishing line adjacent to the shank 12 while wrapping the fishing line around the coiled member 14 longitudinally from the shank to the open-ended eye loop 16. The fishing line is wrapped around the coiled member, as indicated by Arrow A in FIG. 7, in the opposite rotational direction that the coils 22 are formed, as indicated by Arrow B in FIG. 7, such that the line passes transversely through the spaces between adjacent coils 22 and frictionally engages each coil.

The second step, referring to FIG. 8, comprises wrapping the fishing line 46 around the coiled member 14 longitudinally from the open-ended eye loop 16 to the shank 12. The line is wrapped around the coiled member in the same rotational direction as in the first step, such that the line passes transversely through the spaces between adjacent coils and frictionally engages both the coils and the fishing line disposed in the first step.

The third step, referring to FIG. 9, comprises wrapping the fishing line 46 around the coiled member 14 longitudinally from the shank 12 to the open-ended eye loop 16. The line is wrapped around the coiled member in the same rotational direction as in the first two steps, such that the line passes transversely through the spaces between adjacent coils and frictionally engages the coils and fishing line disposed in the first two steps. The fourth and final step to affixing the fishing line to the fishing line connector 10 consists of slipping the line into the open-ended eye loop 16, such that the line passes transversely between the open end 28 and the integral end of the shaft 26 of the eye loop.

As illustrated in FIG. 10, when the simple four step process is followed, a complex frictional connection is achieved between the fishing line connector and the fishing line 46. The open-ended eye loop 16 plays a critical role in "locking" the line so that the line cannot unwrap from the coiled member 14 during typical use. The fishing line connector and the method of affixing a fishing line thereto create a fast, simple and strong knotless connection.

I claim:

1. In combination, a fishing line connector, and a fishing line secured thereto, the fishing line connector comprising a shank having a first end and a second end, an integral coiled member connected to the second end of the shank, the coiled member being defined by a plurality of uniformly spaced, contiguous coaxial coils arranged in longitudinally extending relation, the coils defining an axially extending opening therethrough, and an integral open-ended eye loop connected to an outer end of the coiled member, the fishing line being threadingly engaged in one longitudinal direction successively with each coil along the length of the coiled member, the fishing line then further being threadingly engaged in an opposite longitudinal direction successively with each coil along the length of the coiled member, the fishing line then further being threadingly engaged in the one longitudinal direction successively with each coil along the length of the coiled member and slipped into the open-ended eye loop.

2. The combination of claim 1 where the fishing line connector is made of metal wire between 0.015 and 0.100 inches in diameter.

3. The combination of claim 1 where the spacing between the contiguous coils is between 0.020 and 0.100 inches, and the number of coils is between three and ten.

4. The combination of claim 1 where the open-ended eye loop is substantially aligned with the shank and its axis is substantially perpendicular to the axial opening of the coiled member, and the open-ended eye loop is partially located longitudinally in the axial opening at the outer end of the coiled member.

5. The combination of claim 1 further comprising a fastener located at the first end of the shank, for fastening a fish catching device.

6. The combination as claimed in claim 5, where the fastener is a fishing swivel comprising a pivot member and a resilient clip attached to an outer end of the pivot member.

7. The combination as claimed in claim 5, where the fastener is a fishing leader comprising a pivot member, a flexible member attached to an outer end of the pivot member, and a resilient clip attached to an outer end of the flexible member.

8. The combination as claimed in claim 1, where the first end of the shank is fashioned as a fish hook.

9. The combination as claimed in claim 8, where the cross-sectional diameter of the shank is greater than the cross-sectional diameter of the coils of the coiled member.

10. A fishing hook comprising a shank having a first end and an opposite second end, the first end of the shank being formed as a fishing hook having a pointed end and a barb;

an integral coiled member having first and second opposite ends, the first end of the integral coiled member being directly connected to the second end of the shank, the coiled member being defined by a plurality of uniformly spaced, contiguous coaxial coils arranged in longitudinally extending relation from the first end of the integral coiled member to the second end of the integral coiled member, the coils defining an axially extending opening therethrough, and an integral open-ended eye loop directly connected to the second end of the coiled member such that a fishing line can be wrapped around the coiled member in alternating longitudinal directions, in an opposite rotational direction to that of the coils, passing transversely between successive coils to threadingly engage with each coil along the length of the coiled member and slipped into the open-ended eye loop of the fishing line connector to provide a knotless connection to the fishing line.

11. A fishing hook as claimed in claim 10, where the fishing hook is made of metal wire between 0.015 and 0.100 inches in diameter.

12. A fishing hook as claimed in claim 10 where the spacing between the contiguous coils is between 0.020 and 0.100 inches, and the number of coils is between three and ten.

13. A fishing hook as claimed in claim 10, where the open-ended eye loop is substantially aligned with the shank and its axis is substantially perpendicular to the axial opening of the coiled member, and the open-ended eye loop is partially located longitudinally in the axial opening at the outer end of the coiled member.

14. A fishing hook as claimed in claim 10, where the cross-sectional diameter of the shank is greater than the cross-sectional diameter of the coils of the coiled member.

15. A method for knotlessly attaching a fishing line to a fishing line connector, the fishing line connector comprising a shank having a first end and a second end, an integral coiled member located at the second end of the shank, the coiled member being defined by a plurality of uniformly spaced, contiguous coaxial coils arranged in longitudinally extending relation, the coils defining an axially extending opening therethrough, and an integral open-ended eye loop located at an outer end of the coiled member, the method comprising the steps of:

wrapping the fish line around the coiled member longitudinally from the shank to the open-ended eye loop in an opposite rotational direction to that of the coils, such that the fishing line passes transversely between successive coils and threadingly engages with each coil along the length of the coiled member;

wrapping the fish line around the coiled member longitudinally from the open-ended eye loop to the shank in the same rotational direction as the previous step, such that the fishing line passes transversely between successive coils and threadingly engages with each coil along the length of the coiled member;

wrapping the fishing line around the coiled member longitudinally from the shank to the open-ended eye loop in the same rotational direction as the previous steps, such that the fishing line passes transversely between successive coils and threadingly engages with each coil along the length of the coiled member;

and slipping the fishing line into the open-ended eye loop.

* * * * *